(12) United States Patent
Hong et al.

(10) Patent No.: US 7,217,311 B2
(45) Date of Patent: May 15, 2007

(54) METHOD OF PRODUCING METAL NANOCOMPOSITE POWDER REINFORCED WITH CARBON NANOTUBES AND THE POWER PREPARED THEREBY

(75) Inventors: Soon Hyung Hong, Daejeon (KR); Seung Il Cha, Daejeon (KR); Kyung Tae Kim, Daejeon (KR); Seong Hyun Hong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 304 days.

(21) Appl. No.: 10/799,923

(22) Filed: Mar. 15, 2004

(65) Prior Publication Data

US 2007/0074601 A1 Apr. 5, 2007

(30) Foreign Application Priority Data

Jul. 25, 2003 (KR) ............... 10-2003-0051549

(51) Int. Cl.
B22F 9/20 (2006.01)
(52) U.S. Cl. ......................... 75/345; 75/365
(58) Field of Classification Search ............ 75/345, 75/365, 371
See application file for complete search history.

(56) References Cited

U.S. PATENT DOCUMENTS

| 5,627,140 | A | 5/1997 | Fossheim et al. |
| 6,299,812 | B1 | 10/2001 | Newman et al. |
| 6,346,136 | B1 * | 2/2002 | Chen et al. ............ 75/343 |
| 6,420,293 | B1 | 7/2002 | Chang et al. |
| 6,858,173 | B2 | 2/2005 | Zhan et al. |
| 2003/0181328 | A1 * | 9/2003 | Hwang et al. ............ 502/325 |
| 2004/0167009 | A1 | 8/2004 | Kuntz et al. |
| 2004/0217520 | A1 | 11/2004 | Hong et al. |

FOREIGN PATENT DOCUMENTS

CN   1465729 A   *   1/2004

OTHER PUBLICATIONS

Bian, Z. et al., "Excellent Wave Absorption by Zirconium-Based Bulk Metallic Glass Composites Containing Carbon Nanotubes", *Advanced Materials*, vol. 15, No. 7-8, Apr. 17,2003, pp. 616-621.*
Bian, Z. et al., "Excellent ultrasonic Absorption Ability of Carbon-Nanotube-Reinforced Bulk Metallic Glass Composites", *Applied Physics Letters*, vol. 82, No. 17, Apr. 28, 2003, pp. 2790-2792.*
Chen, X. et al., "Carbon Nanotube omposite Deposits with High Hardness and High Wear Resistance", *Advanced Engineering Materials*, vol. 5, No. 7, May 7, 2003, pp. 514-518.*
Dong, S.R., et al., "An investigation of the sliding wear behavior of Cu-matrix composite reinforced by carbon nanotubes," *Mater. Sci. Eng. A313*:83-87, Elsevier Science B.V. (2001).

(Continued)

*Primary Examiner*—George Wyszomierski
(74) *Attorney, Agent, or Firm*—Sterne, Kessler, Goldstein & Fox P.L.L.C.

(57) ABSTRACT

The present invention relates to a metal nanocomposite powder reinforced with carbon nanotubes and to a process of producing a metal nanocomposite powder homogeneously reinforced with carbon nanotubes in a metal matrix powder.

9 Claims, 6 Drawing Sheets

OTHER PUBLICATIONS

Flahaut, E., et al., "Carbon Nanotube-Metal-Oxide Nanocomposites: Microstructure, Electrical Conductivity and Mechanical Properities," *Acta Mater.* 48: 3803-3812, Pergamon Press (2000).

Xu, C.L., et al., "Fabrication of aluminum-carbon nanotube composites and their electrical properties," *Carbon* 37:855-858, Pergamon Press (1999).

Laurent, C., et al., "Carbon Nanotubes-Fe-Alumina Nanocomposites. Part II: Microstructure and Mechanical Properties of the Hot-Pressed Composites," *J. Eur. Ceram. Soc.* 18:2005-2013, Elsevier Science Ltd. (1998).

Peigney, A., et al., "Carbon nanotubes in novel ceramic matrix nanocomposites," *Ceram. Int.* 26:677-683, Elsevier Science Ltd. (2000).

Siegel, R.W., et al., "Mechanical behavior of polymer and ceramic matrix nanocomposites," *Scripta Mater.* 44:2061-2064, Elsevier Science Ltd. (2001).

Hwang, G.L. et al., "Carbon nanotube reinforced ceramics," *J. Mater. Chem.*, 11:1722-1725 The Royal Society of Chemistry (2001).

Ning, J., et al., "Fabrication and mechanical properties of $SiO_2$ matrix composites reinforced by carbon nanotube," *Mater. Sci. Eng.* A357:392-396 Elsevier Science B.V. (2003).

Ning, J., et al., "Fabrication and thermal property of carbon nanotube/$SiO_2$ composites," *J. Mater. Sci. Let.* 22:1019-1021 Kluwer Academic Publishers (2003).

\* cited by examiner

METHOD OF PRODUCING METAL NANOCOMPOSITE POWDER REINFORCED WITH CARBON NANOTUBES AND THE POWER PREPARED THEREBY

This application claims priority to Korean Patent Application No. 10-2003-0051549, filed Jul. 25, 2003, which is incorporated by reference herein in its entirety.

BACKGROUND OF THE INVENTION

1. Field of the Invention

The present invention relates to a metal nanocomposite powder reinforced with carbon nanotubes and to a process of producing a metal nanocomposite powder homogeneously reinforced with carbon nanotubes in a metal matrix powder.

2. Related Art

In order to fabricate carbon nanotube-reinforced composites, many studies have focused on a powder—powder blending between carbon nanotubes and raw metal or ceramic powder. For example, B. Q. Wei (Wei, B. Q. et al., *Carbon* 37:855–858 (1999)), and S. R. Dong (Dong, S. R. et al., *Materials Science and Engineering*, A313:83–87 (2001)), suggest an aluminum or copper matrix composite material reinforced with carbon nanotubes, which is synthesized using a powder mixing process and a conventional sintering process. However, characterization of these carbon nanotube-reinforced composite materials show low enhancement, or even a decrease, of mechanical properties. In particular, the relative density of the sintered composite materials is very low, ranging from 85% to 95%. The relative density of composites is important since low relative density means the existence of many fracture sources, such as pores and defects, which can originate from low mechanical properties. There are two reasons for these problems. One comes from the severe agglomeration of carbon nanotubes in a metal matrix. The other is the use of conventional consolidation processes. The present invention mainly focuses on a solution to prevent agglomeration of carbon nanotubes in a metal matrix. In order to homogeneously disperse carbon nanotubes in a metal matrix, metal nanocomposite powders homogeneously reinforced with carbon nanotubes are fabricated. Even though the conventional process for producing carbon nanotube reinforced metal matrix composites contains a fabrication process, e.g. ball milling, for homogeneous blending of carbon nanotubes and metal powder, this process is not an effective method of dispersing carbon nanotubes. Therefore, the present invention proposes a new metal nanocomposite powder homogeneously reinforced with carbon nanotube in a metal matrix and a new method for producing these powders.

Previously, the blending of the carbon nanotubes and metal or ceramic powders did not yield satisfactory results. This is due to difficulty in homogeneously dispersing carbon nanotubes in a metal matrix by simple ball milling processes. Composite powder fabricated by conventional processes show severe agglomeration of carbon nanotubes, especially on the surface of metal powder, and the nanotubes are not homogeneously dispersed inside the metal matrix. The agglomeration of carbon nanotubes on the surface of the metal powder prevents metal matrix powder from being sintered during consolidation, since aggregates on the surface of metal powder can interrupt the diffusion pathway of metal atoms between metal powders. This leads not only to low sinterability of matrix materials including the carbon nanotubes but also to low relative density of composite materials. That is to say, after the consolidation process, the agglomerated carbon nanotubes become pores in the composite material.

FIGS. 1A and 1B contain scanning electron micrograph (SEM) pictures showing the surface structure of a conventional composite powder. These figures demonstrate that a simple mixing and dispersing process, such as a ball milling process, does not prevent the carbon nanotubes from being agglomerated and does not provide a uniform mixing of carbon nanotubes with the matrix powder. In other words, it is impossible to produce a sound metal composite powder or material through a conventional mixing or dispersing process. The term "sound" as used herein means that the carbon nanotubes are not agglomerated on a surface of the metal powder, but rather are homogeneously dispersed in the metal powder.

SUMMARY OF THE INVENTION

The present invention is directed to a method of producing a metal nanocomposite powder homogeneously reinforced with carbon nanotubes in a metal matrix without being agglomerated.

The present invention is directed to a method of producing a metal nanocomposite powder in which carbon nanotubes are dispersed in a matrix, the method comprising (a) dispersing carbon nanotubes in a predetermined dispersing solvent to form a dispersed solution, (b) primarily treating the dispersed solution using ultrasonic waves, (c) uniformly mixing water-soluble metal salts or metal hydrates with the treated dispersed solution of (b), (d) secondarily treating the dispersed solution of (c) using ultrasonic waves, (e) drying and calcining the dispersed solution of (d) to produce a metal oxide nanocomposite powder, and (f) reducing the metal oxide nanocomposite powder of (e).

Metal nanocomposite powder produced according to the method of the present invention, in which the carbon nanotubes are dispersed in the metal matrix powder, is illustrated in FIGS. 2A and 2B. FIG. 2A illustrates a carbon nanotube/metal nanocomposite powder, in which the carbon nanotubes intersect grain boundaries. FIG. 2B illustrates a carbon nanotube/metal nanocomposite powder, in which small carbon nanotube agglomerates intersect the grain boundaries in a metal matrix powder.

DETAILED DESCRIPTION

Figure 1A:
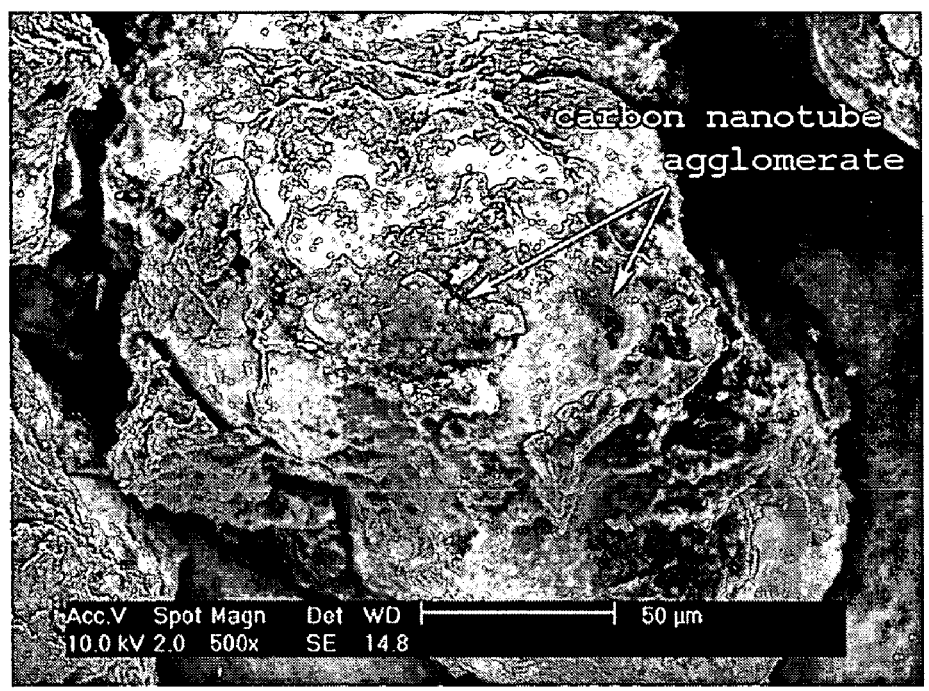
FIG. 1A is a scanning electron microscope (SEM) picture of a conventional metal composite powder, in which carbon nanotubes are agglomerated on a surface of a metal.
Figure 1B:
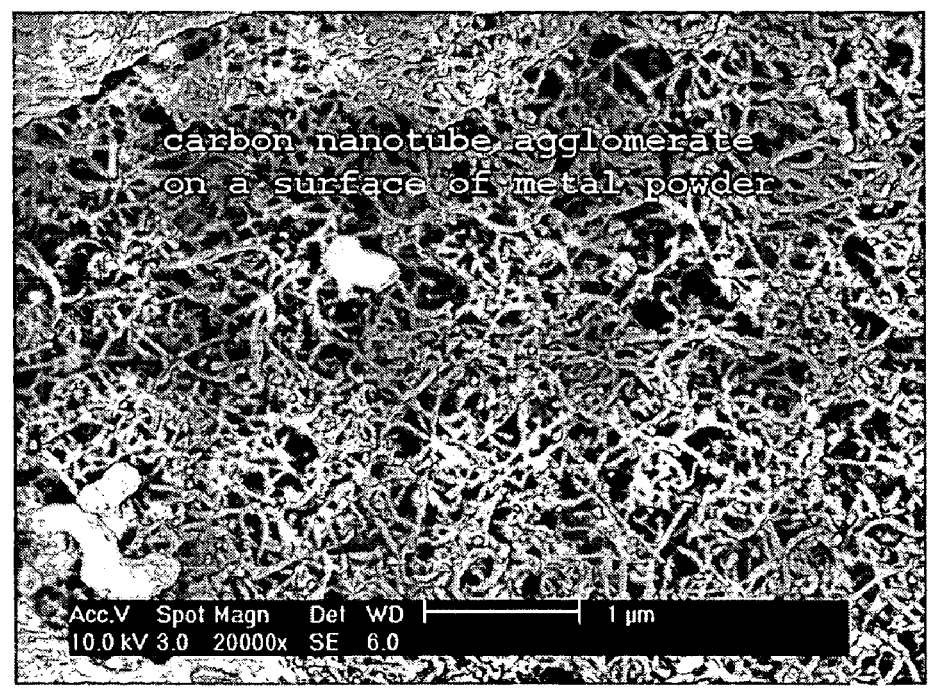
FIG. 1B is a highly magnified view of FIG. 1A.
Figure 2A:
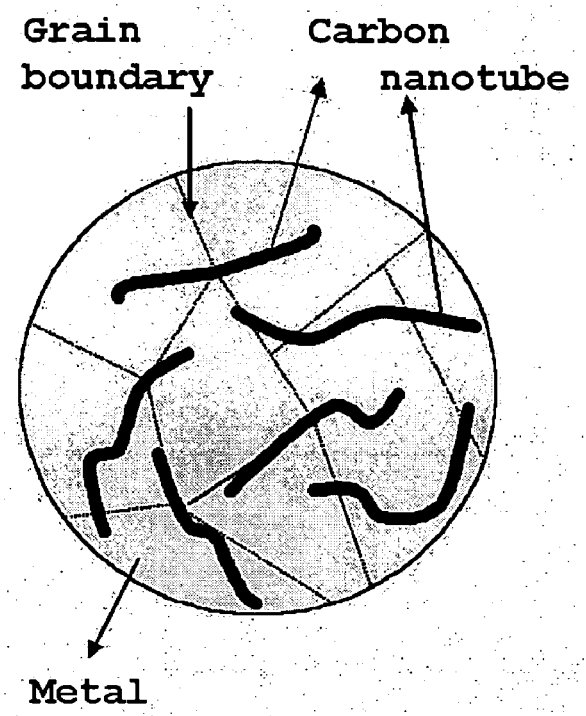
FIG. 2A illustrates a carbon nanotube/metal nanocomposite powder according to the present invention, in which carbon nanotubes intersect grain boundaries.
Figure 2B:
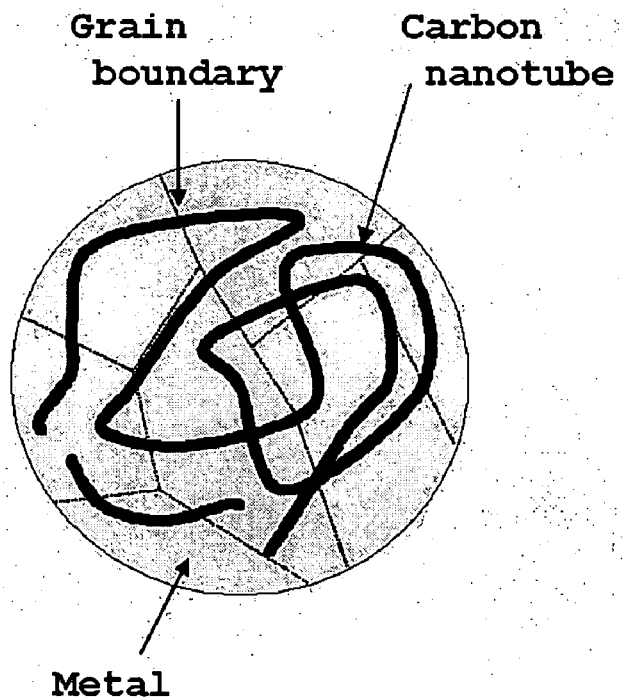
FIG. 2B illustrates another carbon nanotube/metal nanocomposite powder according to the present invention, in which carbon nanotube agglomerates intersect grain boundaries.

The present invention is directed to a method of producing a metal nanocomposite powder in which carbon nanotubes are dispersed in a matrix, the method comprising (a) dispersing carbon nanotubes in a predetermined dispersing solvent to form a dispersed solution, (b) primarily treating the dispersed solution using ultrasonic waves, (c) uniformly mixing water-soluble metal salts or metal hydrates with the treated dispersed solution of (b), (d) secondarily treating the dispersed solution of (c) using ultrasonic waves, (e) drying and calcining the dispersed solution of (d) to produce a metal oxide nanocomposite powder, and (f) reducing the metal oxide nanocomposite powder of (e).

Generally, a carbon nanotube has the strength of 30 GPa and elastic modulus of 1 TPa. The carbon nanotube useful in the present invention is not specifically limited, but it is preferable that its aspect ratio is relatively high. In some embodiments, the aspect ratio of the carbon nanotube is about 10 to about 10,000. Additionally, in some embodiments carbon nanotubes with high purity, i.e., 95% or higher, are used. The carbon nanotube of the present invention can be tube shaped, having a diameter of about 10 nm to about 40 nm and a length of about 5 µm, and is added as a reinforcing material into a metal composite material.

A dispersing solvent plays a role in dispersing a bundle of carbon nanotubes into separate carbon nanotubes. Any kind of dispersing solvents can be used in the present invention as long as the dispersing solvent functionalizes the carbon nanotube; that is to say, functional groups are formed on the carbon nanotube by the dispersing solvent. Examples of dispersing solvents include, but are not limited to, water, ethanol, nitric acid solution, toluene, N,N-dimethylformamide, dichlorocarbene, and thionyl chloride. Water, ethanol, and nitric acid solution each have simple solution characteristics, and realize an electrostatic charge on the surface of the carbon nanotube and the carboxylation of the carbon nanotube, thereby contributing to even dispersement of the carbon nanotube in the dispersing solvent.

A primary ultrasonic treatment is conducted to promote uniform dispersion of the carbon nanotube in the dispersing solvent. In some embodiments, the range of ultrasonic waves is about 40 KHz to about 60 KHz. In some embodiments, the primary ultrasonic treatment can be conducted for about two hours to about ten hours. Any traditional ultrasonic cleaning device can be used within the described range, e.g., Model 08893-16 (Cole-Parmer Co., Vernon Hills, Ill.).

Any metal materials forming water-soluble metal salts or metal hydrates can be used as the metal matrix material of the carbon nanotube/metal nanocomposite powder. In some embodiments, the metal matrix material useful in the present invention can be, but is not limited to, copper, nickel, cobalt, iron, or tungsten.

After adding the water-soluble metal salts or metal hydrates into the dispersing solvent in which carbon nanotubes are already dispersed, a secondary ultrasonic treatment can be conducted under the same conditions as the primary ultrasonic treatment. In some embodiments, the secondary ultrasonic treatment can be conducted for about ten hours or less using ultrasonic waves of about 40 KHz to about 60 KHz. A secondary ultrasonic treatment for more than about ten hours can cause surface defects on the carbon nanotubes, thus a graphite structure arranged on the surface of the carbon nanotubes can be destroyed. The ultrasonic treatment serves to evenly disperse the carbon nanotubes and water-soluble salts in the dispersing solvent and induce formation of a chemical bond between molecules of the carbon nanotubes and the water-soluble salts.

In some embodiments, drying and calcination are conducted under various conditions, e.g., under a vacuum, a hydrogen gas atmosphere, an argon gas atmosphere, or an inert gas (nitrogen or any atmosphere where the carbon nanotube is not damaged). Conditions for calcination can be changed according to the kind of metal matrix desired.

The carbon nanotube is apt to be rapidly oxidized and destroyed at about 400° C. or higher in atmospheric air. Accordingly, in some embodiments the drying process is conducted at about 80° C. to about 100° C. so as to sufficiently remove moisture from the dispersing solvent. In some embodiments, the drying process is conducted at such temperature for about 6 hours to about 12 hours, so as to sufficiently supply oxygen and air to a composite powder. A drying process under these conditions removes moisture and any organic solvents from the composite powder.

Conditions for calcination depend on the kind of metal matrix used. For example, if the metal matrix requires a calcination temperature of about 400° C. or lower, the carbon nanotube can be calcined at about 200° C. to about 350° C. under atmospheric air to prevent the carbon nanotube from being damaged. In this regard, impurities, such as organic solvents contained in the composite powder, are removed and oxides are formed on the composite powder at about 350° C. or lower. If the calcination temperature is lower than about 200° C., the organic solvent is insufficiently removed from the composite powder. The calcination process can be conducted for about one hour to about four hours so as to form stable oxides. On the other hand, when the metal matrix requires a calcination temperature of about 400° C. or higher, calcination can be conducted under a reduced pressure (e.g., about $10^{-1}$ torr) so as to prevent the carbon nanotubes from being exposed to high temperatures and air, which leads to damage, and can be conducted at a temperature range of about 400° C. to about 1700° C. so as to produce stable oxides. When the calcination is conducted at about 1700° C. or higher, the carbon nanotubes can be easily damaged by oxygen even though oxygen exists at low concentration under the reduced pressure. Hence, in some embodiments the calcination is conducted at about 1700° C. or lower when the metal matrix requires a calcination temperature of about 400° C. or higher. In some embodiments, the metal nanocomposite powder is dried at about 80° C. to about 100° C. for about 6 to about 12 hours and then again dried at about 300° C. to about 350° C. for about 6 to about 12 hours to sufficiently provide air throughout the composite powder to form the stable oxides at the reduced pressure.

In Example 1, the composite powder is produced using copper oxide as the metal matrix, the copper oxide requiring a calcination temperature of about 400° C. or lower.

The drying process functions to remove hydrogen, water vapor and nitrogen from the composite powder. The calcination process contributes to producing a stable carbon nanotube/metal oxide nanocomposite powder.

Figure 5:
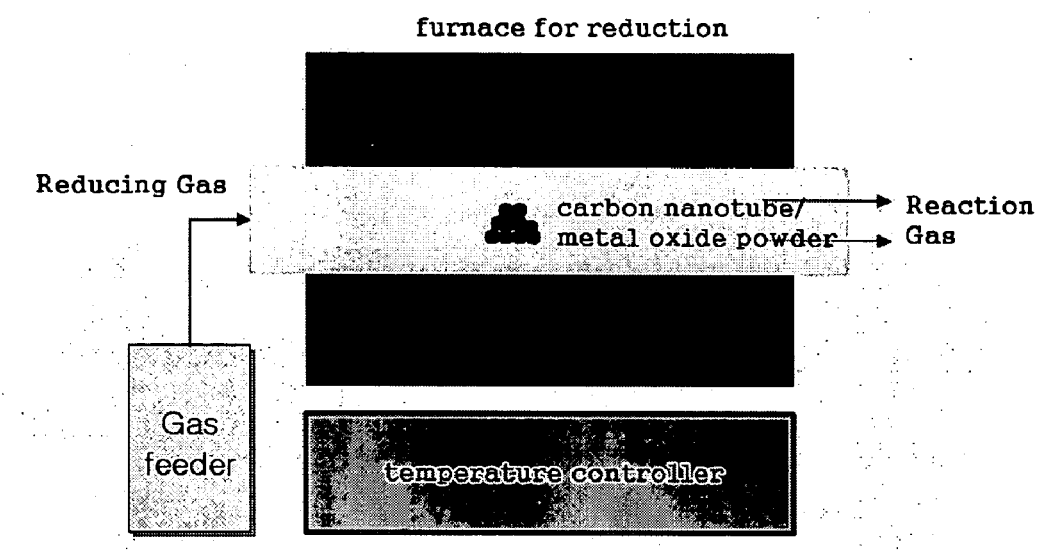
FIG. 5 schematically illustrates a reducing gas furnace used in the present invention.

The calcined carbon nanotube/metal oxide nanocomposite powder is reduced to separate oxygen from metal oxide in the carbon nanotube/metal oxide nanocomposite powder. FIG. 5 illustrates a furnace for a reduction process. In some embodiments the reduction process is conducted at about 100° C. to about 1000° C. under a reducing gas, such as CO, $CO_2$, or hydrogen atmosphere. Hydrogen gas is useful to prevent the carbon nanotube from being damaged and to convert the metal oxide into a metal without affecting the carbon nanotube since hydrogen easily bonds to oxygen. Further, hydrogen gas can be used in reduction processes conducted at relatively wide temperature ranges of about 100° C. to about 1000° C. and for a relatively long time of from about one hour to about ten hours. However, since hydrogen easily reacts with oxygen, causing an explosion, and since oxygen significantly affects the oxidation of carbon nanotubes, oxygen should not exist in the furnace. The absence of oxygen allows heat treatment of the composite powder at relatively high temperatures under a hydrogen atmosphere. Furthermore, in some embodiments CO and $CO_2$ are not used at about 500° C. or higher to prevent the oxidation of the carbon nanotube because the carbon nanotube is easily damaged by oxygen even though CO or $CO_2$ is used instead of hydrogen. CO or $CO_2$ is cautiously used at about 500° C. or lower.

Some variables, such as the reduction temperature and a flow rate of the reducing gas, are determined through experimentation and are dependent on the metal matrix used.

Figure 3:
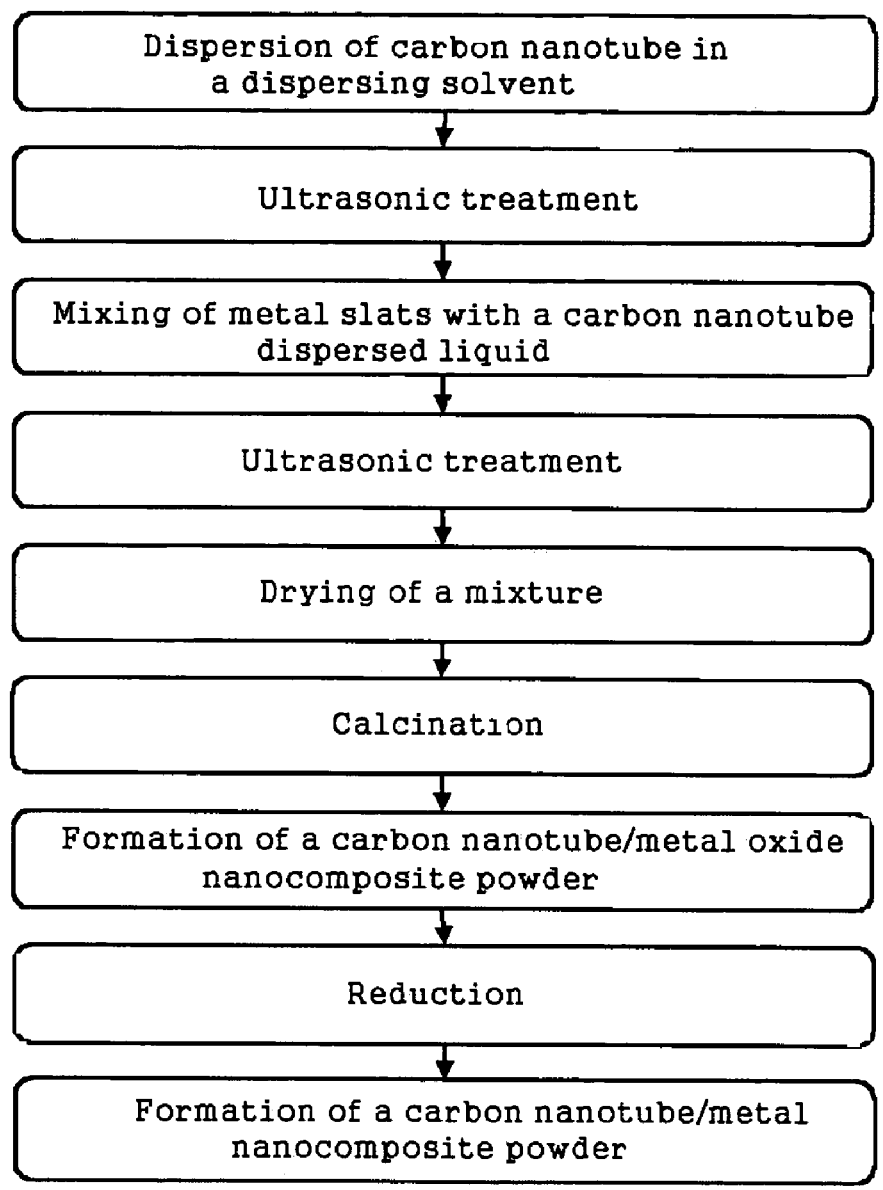
FIG. 3 is a flow chart illustrating the fabrication of the carbon nanotube/metal nanocomposite powder according to the present invention.

FIG. 3 illustrates a flow chart depicting the production of a metal nanocomposite powder reinforced with carbon nanotubes according to the present invention. Example 1 provides a detailed description of the production of the metal nanocomposite powder reinforced with the carbon nanotube as shown in FIG. 3. In this example, a water-soluble copper salt is used to adopt copper powder as the metal matrix. It is understood that modifications of a metal matrix will be apparent to those skilled in the art without departing from the spirit of the invention.

A better understanding of the present invention can be obtained in light of the following example which is set forth to illustrate, but is not to be construed to limit, the present invention.

EXAMPLE 1

A carbon nanotube/copper nanocomposite powder calcined at 400° C. or lower was provided. The procedure used to produce the carbon nanotube/copper nanocomposite powder was as follows. 20 mg of multi-wall carbon nanotube (Nanotech Co. Ltd., Korea) (diameter: about 10 to about 40 nm; length: 5 μm) was added into 300 ml of ethanol acting as a dispersing solvent. The resulting solution was treated using ultrasonic waves of 50 W and 45 KHz generated from an ultrasonic cleaning device (Model 08893-16, Cole-Parmer Co., Vernon Hills, Ill.) for two hours to produce a dispersion solution in which carbon nanotubes were evenly dispersed in an ethanol solution.

3 g of copper salt ($Cu(CH_3COO)_2$) was added into the dispersion solution to allow the voluminal percentage of carbon nanotubes in the dispersion solution to be 10% (by volume). The resulting dispersion solution was again treated using ultrasonic waves of 50 W and 45 KHz for two hours, thereby evenly dispersing the carbon nanotube and copper molecules in the dispersion solution and inducing the chemical bond between molecules of the carbon nanotube and copper.

Figure 4A:
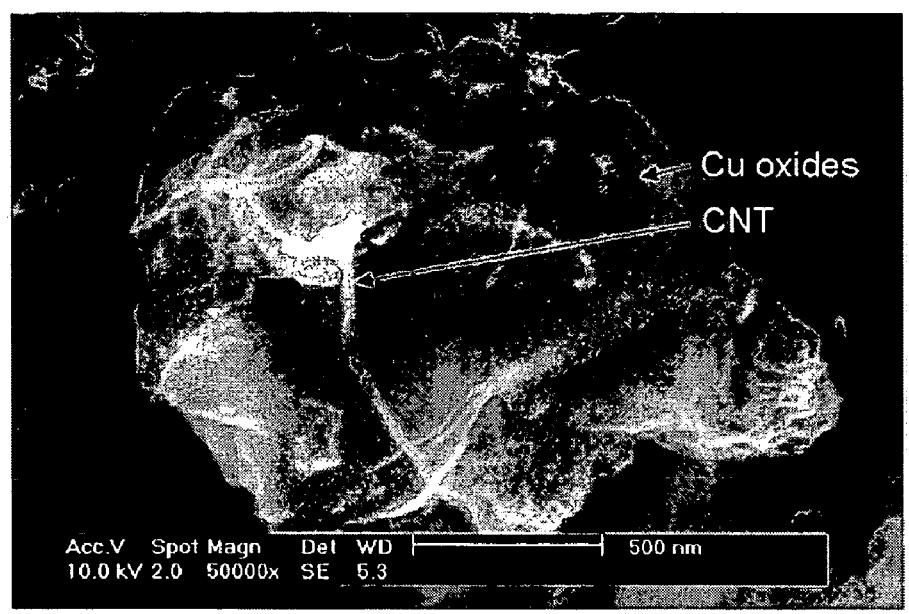
FIG. 4A is a SEM picture showing a surface structure of a carbon nanotube/copper oxide nanocomposite powder after the calcination process of the present invention.
Figure 4B:
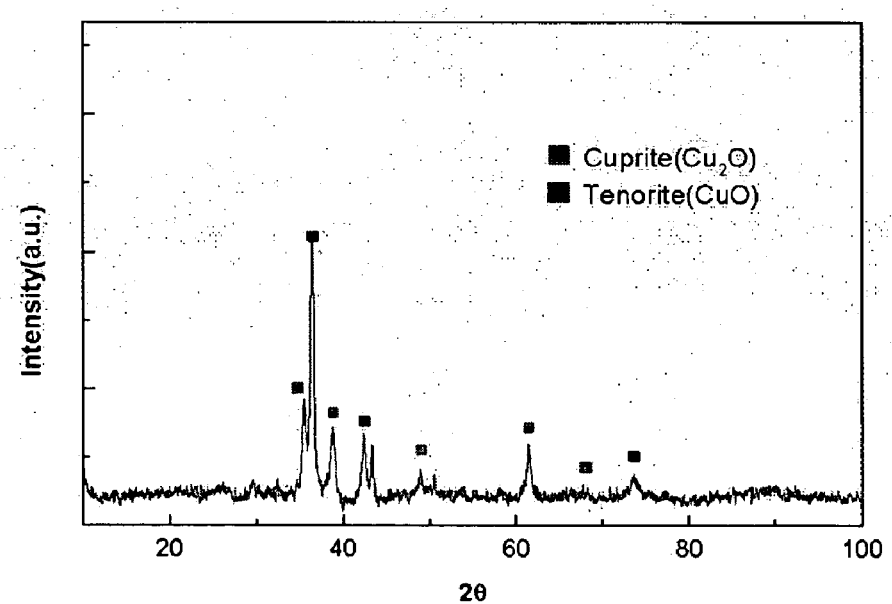
FIG. 4B illustrates qualitative analysis results of carbon nanotube/copper oxide nanocomposite powder after the calcination process of the present invention by use of an X-ray diffractometer (XRD).

The dispersion solution treated using the ultrasonic wave was heated at about 80° C. to 100° C. for eight hours to remove water from the dispersion solution, and calcined at 300° C. to 350° C. for four hours under normal atmosphere, thereby removing needless organic solvent from the dispersion solution and sufficiently providing oxygen to the dispersion solution to form the stable oxide (see FIGS. 4A and 4B).

After the calcination, reduction was conducted in a furnace as shown in FIG. 5. The reduction was conducted at 200° C. for two hours under a hydrogen gas atmosphere.

Figure 6A:
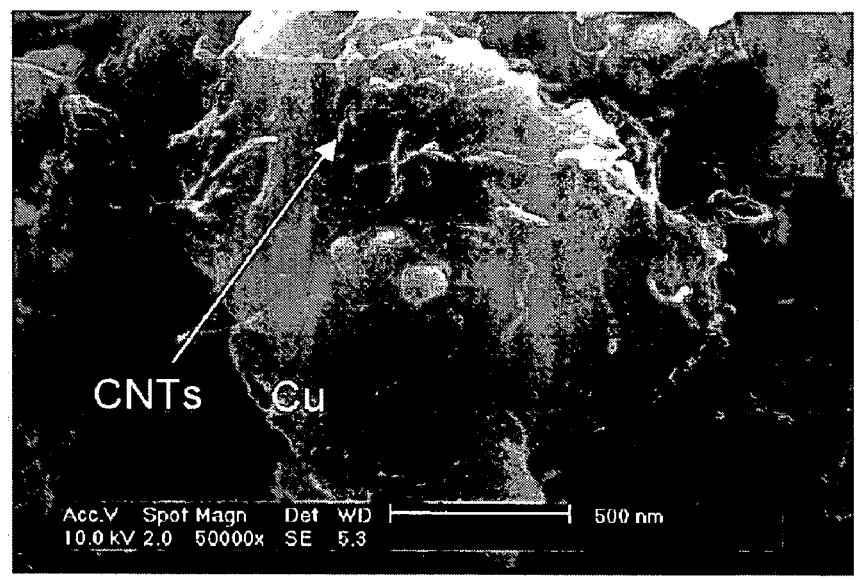
FIG. 6A is a SEM picture showing a surface structure of a carbon nanotube/copper nanocomposite powder after the reduction process of the present invention.

The analysis of reduced powder was performed using an XRD to confirm a kind and a phase state of the reduced powder. The results shown in FIG. 6A confirm that a carbon nanotube/copper nanocomposite powder was obtained.

Figure 6B:
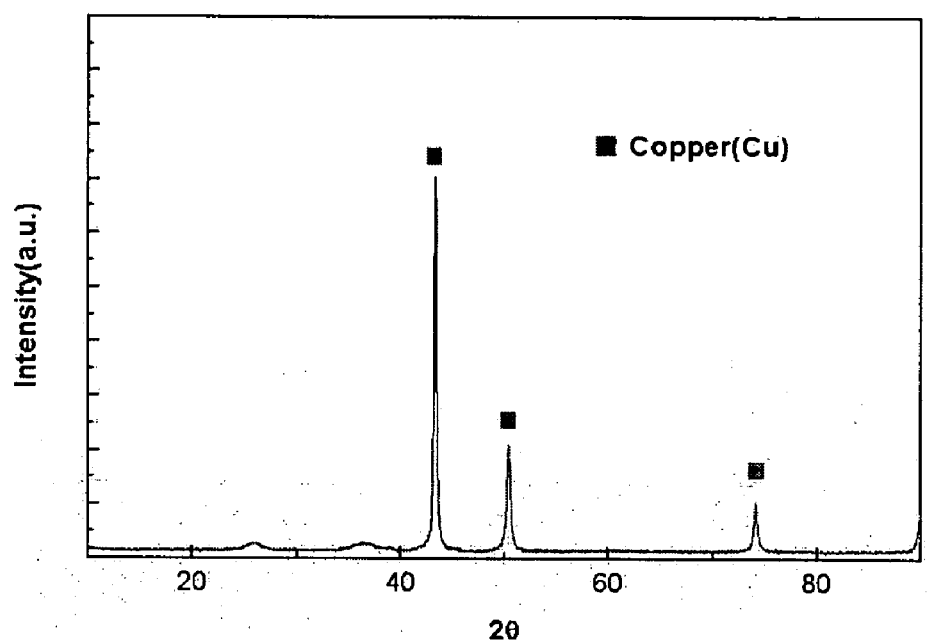
FIG. 6B illustrates qualitative analysis results of carbon nanotube/copper nanocomposite powder after the reduction process of the present invention by use of XRD.

Furthermore, the analysis of the reduced powder by a SEM, as shown in FIG. 6B, confirmed that a surface state of the reduced powder was the same as that of the carbon nanotube/copper nanocomposite powder; the morphology of the reduced powder was greatly improved in comparison with conventional composite powder. Additionally, as described in Table 1, an initially estimated voluminal percentage of the carbon nanotube in the carbon nanotube/copper nanocomposite powder was the same as a measured voluminal percentage of the carbon nanotube in the carbon nanotube/copper nanocomposite powder. This implies that the voluminal percentage of carbon nanotubes can be easily determined when a composite material powder is produced.

TABLE 1

Volume percentage of the carbon nanotube contained in the carbon nanotube/copper nanocomposite powder Initially estimated volume percentage of carbon nanotube in carbon nanotube/copper nanocomposite powder

| Carbon nanotube (g) | Added copper acetates (g) | Copper in copper acetates (g) | Weight percentage of carbon nanotube (wt %) | Volume percentage of carbon nanotube (vol %) |
|---|---|---|---|---|
| 0.02 | 3 | 0.95 | 2.5 | 10 |

Measured volume percentage of carbon nanotube in carbon nanotube/copper nanocomposite powder

| | Measured weight percentage of carbon (wt %) | Volume percentage (vol %) |
|---|---|---|
| Copper oxide powder after calcination | 2.3 | 10 |
| Copper powder after reduction | 2.3 | 10 |

As described herein, the present invention provides a metal nanocomposite powder reinforced with carbon nanotubes, in which the carbon nanotubes are evenly dispersed in a metal matrix, thereby avoiding the agglomeration of carbon nanotubes, which is a problem of conventional composite powders and materials containing carbon nanotubes. Therefore, installation costs of a device for producing the metal nanocomposite powder of the present invention are reduced, production processing of the metal nanocomposite powder is simplified, and mass production of the metal nanocomposite powder becomes feasible.

Conventional studies of carbon nanotubes have focused on an electronic element field for the dispersion, basical functionalization, and alignment of carbon nanotubes. However, the present invention provides a base technology for the production of a metal nanocomposite material including carbon nanotubes. Accordingly, metal nanocomposite powders can be used as high-valued abrasive materials or wear-resistant coating materials. Furthermore, the metal nanocomposite powder of the present invention can be applied to industrial fields which utilize conventional metal composite materials, such as the aerospace, high-performance machine parts, and medical industry, because it has high sintering performance and easily becomes bulky.

This example illustrates one possible method of the present invention. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method of producing a metal nanocomposite powder in which carbon nanotubes are dispersed in a matrix, the method comprising:
   (a) dispersing carbon nanotubes in a predetermined dispersing solvent to form a dispersed solution;
   (b) primarily treating the dispersed solution using ultrasonic waves;
   (c) uniformly mixing water-soluble metal salts or metal hydrates with the treated dispersed solution of (b);
   (d) secondarily treating the dispersed solution of (c) using ultrasonic waves;
   (e) drying and calcining the dispersed solution of (d) to produce a metal oxide nanocomposite powder; and
   (f) reducing the metal oxide nanocomposite powder of (e).

2. The method of claim 1, wherein the dispersing solvent of (a) is selected from the group consisting of water, ethanol, nitric acid solution, toluene, N,N-dimethylformamide, dichlorocarbene, and thionyl chloride.

3. The method of claim 1, wherein the water-soluble metal salts or metal hydrates of (c) comprise a metal selected from the group consisting of copper, nickel, cobalt, iron, and tungsten.

4. The method of claim 1, wherein the drying of (e) is conducted at about 80° C. to about 100° C.

5. The method of claim 1, wherein the calcining of (e) is conducted at about 200° C. to about 350° C. under atmospheric air.

6. The method of claim 1, wherein the calcining of (e) is conducted at about 400° C. to about 1700° C. under reduced pressure.

7. The method of claim 6, further comprising a drying step at about 300° C. to about 350° C.

8. The method of claim 1, wherein the reducing of (f) is conducted under a reducing gas atmosphere.

9. The method of claim 1, wherein the reducing of (f) is conducted under a hydrogen, CO, or $CO_2$ gas atmosphere.

* * * * *